United States Patent [19]

Nakagami

[11] 4,167,161
[45] Sep. 11, 1979

[54] DIRECTIONAL AUXILIARY INTAKE INJECTION FOR INTERNAL COMBUSTION ENGINE

[75] Inventor: Tatsuro Nakagami, Kyoto, Japan

[73] Assignee: Mitsubishi Jidosha Kogyo Kabushiki Kaisha, Tokyo, Japan

[21] Appl. No.: 810,452

[22] Filed: Jun. 27, 1977

[30] Foreign Application Priority Data

Jul. 9, 1976 [JP] Japan .................. 51-82388
Dec. 8, 1976 [JP] Japan .................. 51-147511

[51] Int. Cl.² .................. F02M 23/04; F02M 7/00
[52] U.S. Cl. .................. 123/75 B; 123/119 DB;
123/124 R; 123/124 A; 123/30 C
[58] Field of Search ............. 123/325 T, 30 C, 169 C, 123/169 CL, 119 A, 119 D, 119 DB, 124 R, 124 A

[56] References Cited

U.S. PATENT DOCUMENTS

| | | | |
|---|---|---|---|
| 1,624,432 | 4/1927 | Pierce | 123/119 DB |
| 3,408,992 | 11/1968 | Von Seggern et al. | 123/75 B |
| 3,659,564 | 5/1972 | Sazuki et al. | 123/32 ST |
| 3,739,760 | 6/1973 | Charron | 123/119 DB |
| 3,866,588 | 2/1975 | Nahada | 123/124 A |
| 3,913,541 | 10/1975 | Scott, Jr. | 123/124 R |
| 3,964,451 | 6/1976 | Goto | 123/75 B |
| 3,976,039 | 8/1976 | Henault | 123/119 D |
| 3,991,729 | 11/1976 | Notaro | 123/75 B |
| 4,015,568 | 4/1977 | Horiye et al. | 123/124 R |

Primary Examiner—Charles J. Myhre
Assistant Examiner—David D. Reynolds
Attorney, Agent, or Firm—Sughrue, Rothwell, Mion, Zinn and Macpeak

[57] ABSTRACT

An auxiliary charge of air, fuel mixture, and/or recycled exhaust gas is injected into the combustion chambers of an engine through directional ports adjacent the spark plug gaps to enhance combustion, reduce noxious emissions, scavenge exhaust gases, etc. The injection timing is controlled by cam driven valves, and the magnitude thereof is regulated in accordance with both engine temperature and throttle valve opening or engine load, the latter being sensed by vacuum passages adjacent the throttle in the carburetor throat or by a direct coupling to the throttle valve.

12 Claims, 18 Drawing Figures

DIRECTIONAL AUXILIARY INTAKE INJECTION FOR INTERNAL COMBUSTION ENGINE

BACKGROUND OF THE INVENTION

This invention relates to an improved automobile engine having directional auxiliary intake injection adjacent the spark gaps for enhancing combustion, reducing emissions, etc.

In the idling or light-load operation of a conventional automobile engine, the degree of throttle valve opening is small and the amount of gas drawn in is small. Thus, the speed of the gas mixture flowing into a cylinder during a suction stroke is low and its swirl into the cylinder is weak. Consequently, its swirl in the cylinder is also weak at the time of ignition which usually takes place in a final part of a compression stroke, and the ignitability and combustibility thereof is poor. In order to secure the safe operation of an engine, it is thus necessary to supply a gas mixture that has an air/fuel ratio smaller than that of a mixture supplied during high-load operation. This increases the fuel cost and the production of CO and HC in the exhaust gas due to the incomplete combustion of the dense gas mixture. It has recently been proposed that a gas mixture having a ratio smaller than a theoretical one be used to decrease the CO, HC and NOx emission in the engine exhaust. It has also been proposed that part of the exhaust gas be extracted from the engine exhaust system and fed back into the gas mixture to be burned to decrease the NOx in the exhaust gas. When either of the above techniques is used, however, the drivability of the engine, especially during idling and light-loads, is decreased because the ignitability and combustibility of the gas mixture in such cases is poor. Thus, the fuel cost is increased.

SUMMARY OF THE INVENTION

According to the present invention, an auxiliary charge of air, fuel mixture, and/or recycled exhaust gas is injected into the combustion chambers of an engine through directional ports adjacent the spark plug gaps to enhance combustion, reduce noxious emissions, scavenge exhaust gases, etc. The injection timing is controlled by cam driven valves, and the magnitude thereof is regulated in accordance with both engine temperature and throttle valve opening or engine load, the latter being sensed by vacuum passages adjacent the throttle in the carburetor throat or by a direct coupling to the throttle valve.

DETAILED DESCRIPTION OF THE PREFERRED EMBODIMENTS

Figure 1:
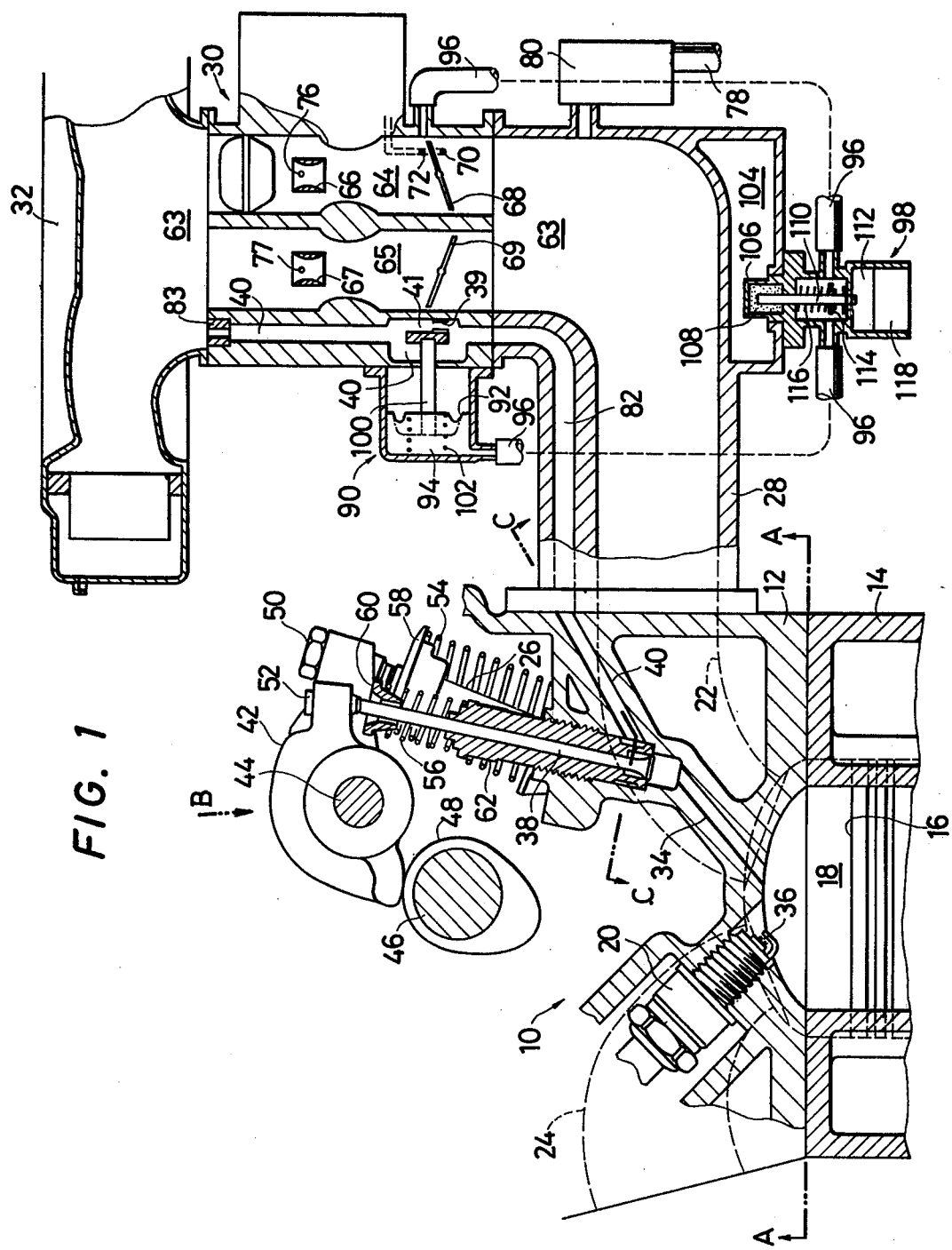
FIG. 1 is a schematic illustration of a first embodiment of the present invention.
Figure 2:
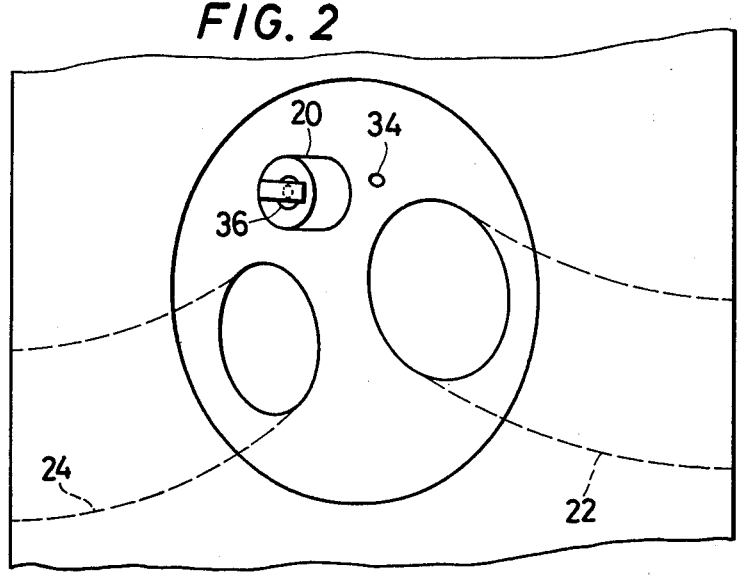
FIG. 2 is a view from line A—A of FIG. 1.
Figure 3:
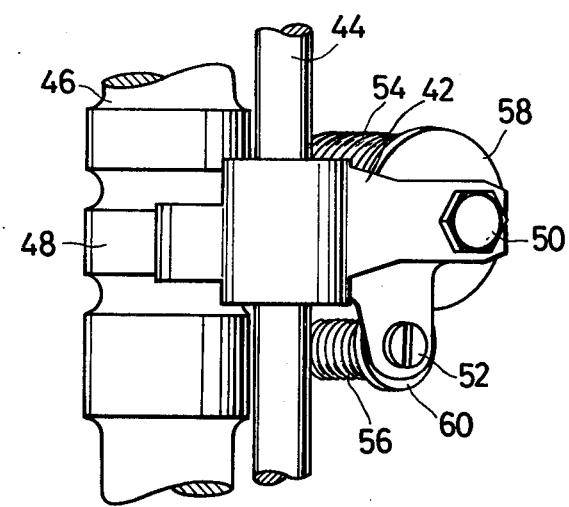
FIG. 3 is a view from line B—B of FIG. 1.
Figure 4:
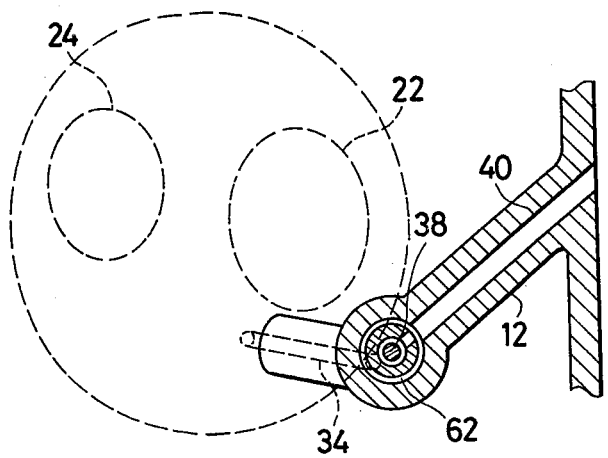
FIG. 4 is a view from line C—C of FIG. 1.

A first embodiment of this invention will now be described with reference to FIGS. 1-5. Reference numeral 10 designates the main body of a gasoline engine for automobiles, 12 a cylinder head, 14 a cylinder block, 16 a piston, 18 a combustion chamber, 20 a spark plug, 22 a main suction port, 24 an exhaust port, 26 a main suction valve, 28 a manifold, 30 a carburetor, and 32 an air cleaner.

The cylinder head 12 has an injection port 34 therein which opens into the combustion chamber 18. The port 34 is directed to the space just below the gap 36 of the spark plug 20 and also toward the piston 16. The port makes a preselected angle of, for example, about 30°–60° with the top surface of the piston 16, and communicates with an auxiliary suction passage 40 via an auxiliary suction valve 38.

The main suction valve 26 and the auxiliary suction valve 38 are poppet valves which are both driven by a rocker arm 42. The rocker arm 42 is mounted on a rocker shaft 44 and oscillates as it is engaged by a cam 48 mounted on a cam shaft 46 which is rotated with a crank shaft, not shown in the drawings. The rocker arm 42 has a bifurcated arm portion on the opposite side of a surface thereof which engages with the cam 48, and the bifurcated portion is provided with adjusting screws 50, 52, an end surface of the screw 50 being engaged with the upper end surface of a valve rod of the main suction valve 26, and an end surface of the screw 52 being engaged with the upper end surface of the auxiliary suction valve 38. 54 and 56 are valve springs, 58 and 60 are spring retainers, and 62 is a valve guide for the auxiliary suction valve 38.

The carburetor portion of a main suction passage 63, which communicates with an air cleaner 32 via a carburetor 30, a suction manifold 28 and a suction port 22, is provided with a primary port 64 and a secondary port 65 in which venturis 66, 67 and throttle valves 68, 69 are provided. In the inner surface of a portion of the suction passage 63 that is near a position whereat the throttle valve 68 is completely closed, an idle port 70, from which a fuel is supplied during idling and light-load operation of the engine, and a slow port 72 are provided, and an adjusting screw (not shown) is provided in the idle port 70. In the venturis 66, 67 main nozzles 76, 77 are provided from which fuel is supplied during medium and high-load operation of the engine.

An exhaust gas-recycling passage 78 from an exhaust manifold, not shown, is connected to the manifold 28 via a control valve 80.

The auxiliary suction passage 40 communicates with the main suction passage 63 on the upstream side of the venturi 67 via a pipe 82 integral with the manifold 28 and a passage formed in the carburetor 30.

90 is a control means provided in the auxiliary suction passage 40 and having a negative pressure passage 96 communicated with a negative-pressure chamber 94 whose one end is communicated with a portion of the auxiliary suction passage just upstream of the position of the completely opened throttle valve 68, and whose other end comprises a diaphragm 92; a thermovalve 98 for opening the passage 96 to the atmosphere; and a control valve 100 connected to the center of the diaphragm 92. 102 is a spring for biasing the control valve 100 toward its closed position via the said diaphragm 92. The thermovalve 98 has a heat-sensitive portion 106 inserted in a heat riser 104 in the suction manifold into which engine-cooling water is introduced; a thermoexpansive thermowax 108 in the heat-sensitive portion 106; a rod 110 actuated by the expansion of the thermowax 108; a valve 114 for venting the passage 96 to atmosphere via passage 112 in response to the actuation of the rod 110; a spring 116 for biasing the valve 114 in a closing direction; and an air cleaner 118. 39 is a throttle provided in bypass 41 whereby an upstream portion of the auxiliary passage 40 with respect to the control valve 100 is communicated with a downstream portion thereof.

Figure 5:
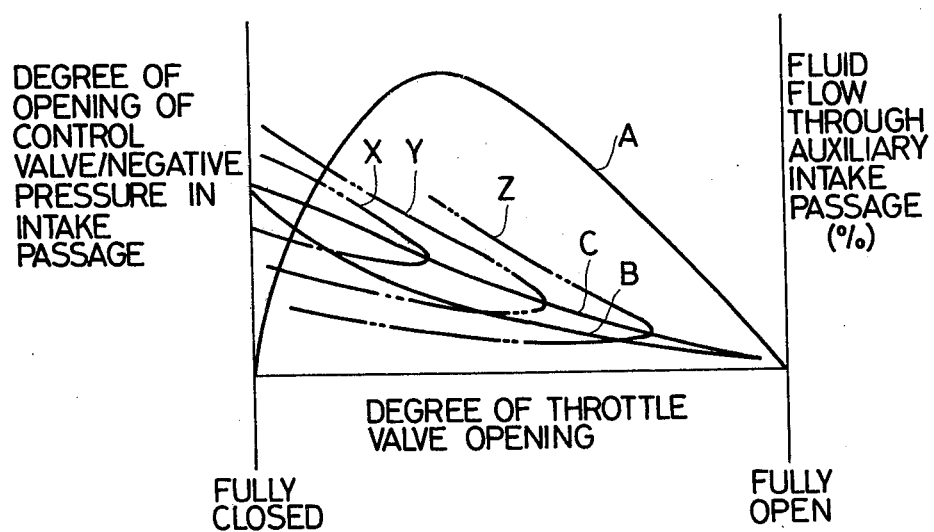
FIG. 5 shows the flow rate characteristics through an auxiliary intake or suction passage of the invention.

The control valve means 90 is actuated in accordance with the characteristic shown by the solid curve A in FIG. 5 representing the negative pressure in the valve chamber which is open to a portion of the main suction passage just upstream of the position whereat the throttle valve 68 is completely closed; the degree of opening of the auxiliary suction passage is in proportion to this negative pressure. In FIG. 5 the solid line B shows the percentage flow amount (with respect to the total amount of sucked gas) of the gas supplied from the bypass 41 alone, and line C shows the percentage flow amount of the gas supplied from the auxiliary suction passage 40 and the bypass 41. The dotted lines in FIG. 5 show fuel cost increase characteristics, with curves X, Y and Z corresponding to fuel cost increase rates of 10%, 5% and 2%, respectively.

When the engine is warm the thermovalve 98 closes the atmosphere-communication passage 112 whereafter the negative pressure in the main suction passage just upstream of the throttle valve 68 is supplied the negative-pressure chamber 94 of the control valve means 90 in accordance with curve A in FIG. 5 to thereby regulate the degree of opening of the auxiliary suction passage 40 in proportion to said negative pressure, and inject a gas from the injection port 34 into the combustion chamber 18 in accordance with line C in FIG. 5. In the meantime, the majority of the air sucked from the air cleaner 32 into the passage 63 is mixed with fuel at a preselected ratio in the carburetor 30 and the resulting gas mixture is sucked into the combustion chamber 18 through the port 22. The amount and speed of the gas mixture injected through the port 34 varies depending upon the degree of opening of the throttle valve 68, i.e. the engine load, and the degree of opening of the control valve 100. During idling and light-load operations the amount of gas mixture supplied from the main suction passage 63 is small owing to the action of the throttle valve 68 and a high negative pressure is produced in the combustion chamber 18 during the suction stroke. However, the inside of the main suction passage 63 on the upstream side of the venturi 66 is at about atmospheric pressure and, due to the pressure difference, a large amount of air is forcibly injected from the injection port 34 into the combustion chamber 18 via the auxiliary passage 40. In this case, air at about atmospheric pressure is supplied to the negative-pressure chamber 94 via the passage 96, and the control valve 100 is closed by the spring 102. As a result, a rapid whirling or turbulent flow occurs in the combustion chamber 18 due to the injected air flow, and the gas mixture drawn in from the main passage 63 is diluted as it is mixed with air and formed in layers or irregularly-dotted masses. The injected air flow passes just below the spark gap 36 and then, as the residual burned gas in the vicinity of the spark gap is swept away, a fresh gas mixture flows into the space near the spark gap.

Consequently, at the time of ignition in the latter part of the compression stroke, a rapid whirling or turbulent flow is present. Thus, a gas mixture always flows around the spark gap 36, and it has been ascertained by experiments that the flame-spreading speed in the engine of this invention is higher than that in a conventional engine, the flame-dying limit is remarkably advanced, the fuel cost is reduced, even when the gas mixture is diluted, the decrease in output is small, and the drivability is improved. The amount of exhaust gas sucked into the manifold 28 via the exhaust gas-recycling manifold 78 is controlled by the control valve 80 so that the amount of NOx in the exhaust is below a preselected value. In medium-load operation whereat the throttle valve opening and effect is medium, the pressure difference between the auxiliary suction passage 40 and the main suction passage 63 decreases somewhat. However, the opening of the control valve 100 is maximum as shown by the dotted curve in FIG. 5, whereby a comparatively large amount of air is injected to sufficiently compensate the pressure difference.

In high-load operation the throttle opening is high, its throttling effect is small, and a large amount of gas mixture is sucked into the combustion chamber 18 via the main valve 63. The negative pressure produced in the combustion chamber 18 is thus low, the amount and strength of the air injected from the auxiliary suction passage 40 is decreased, and the swirling effect of the injected air is also decreased. In this case the suction effect is great and a rapid whirling or turbulent flow occurs when the gas mixture from suction port 22 flows into the combustion chamber 18. The temperature of the inner surface of the combustion chamber also rises. Consequently, the flame-spreading speed of the gas mixture is high and its combustibility is good even if a rapid whirling or turbulence is not produced by the injection flow from the port 34.

When the engine is cold the thermovalve 98 communicates the passage 96 to atmosphere, whereby the control valve 100 closes the auxiliary suction passage 40. When the engine is cold the combustion of the gas is extremely unstable and the maximum air/fuel ratio at the combustion limit is greatly decreased. In this case, however, the gas mixture produced by the carburetor 30 is supplied via the main suction passage 63 to the combustion chamber 18, and at the same time the air passing through the bypass passage 41 provided with the orifice 39 is supplied to the combustion chamber only via the auxiliary passage 40. Thus the air/fuel ratio does not become excessively high. The gas mixture may therefore be stably burned even when the engine is started in a cold condition.

In light-load operation where the combustion conditions are bad due to the inner surface of the combustion chamber having a comparatively low temperature and a poor suction rate, not only a gas mixture having a total air/fuel ratio of 11–14 obtained by mixing part of the exhaust gas with the air flowing from the port 34 into the combustion chamber, but also a diluted mixed gas having a total air/fuel ratio of 15–21 and a low combustibility, may be stably burned. In this case, rapid whirling or turbulent flow of the gas mixture occurs due to the air forcibly injected from the port 34, and the injected air is mixed with the gas mixture from the main suction passage 63. Thus, the rate of combustion is increased without increasing the production of NOx, the combustion time is shortened, the fuel cost is reduced, the drivability of the engine is improved, and the exhaust of unburned gases of HC, CO, etc. is decreased.

Figure 6:
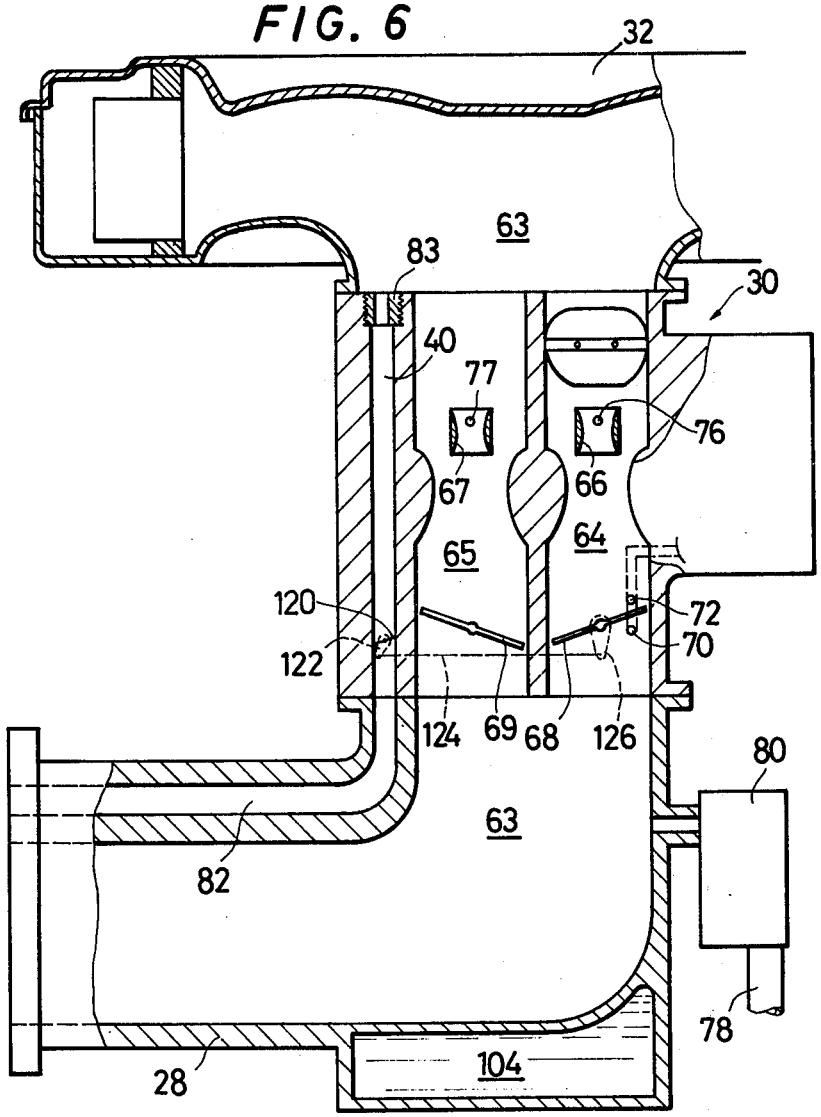
FIG. 6 is a schematic illustration of a second embodiment of the invention.
Figure 7:
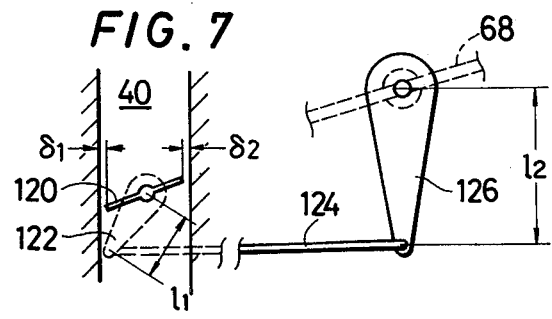
FIG. 7 is an explanatory illustration of the essential parts of the construction of FIG. 6.

A second embodiment of this invention is shown in FIGS. 6 and 7, wherein a throttle valve 120 is provided in an auxiliary suction passage 40 so that the length l1 of a lever 122 of the throttle valve 120 is smaller than the length l2 of a lever 126 of a throttle valve 68 coupled by a rod 124. The degree of opening of the throttle valve 68 and that of the throttle valve 120 are substantially in accordance with the solid curve C in FIG. 5. This embodiment thus has the same action and effect as the first embodiment. In the second embodiment the throttle valve 120 has side gaps δ1, δ2 whereby the auxiliary suction passage 40 is not completely closed even when the throttle valve 120 is completely closed or opened.

Figure 8:
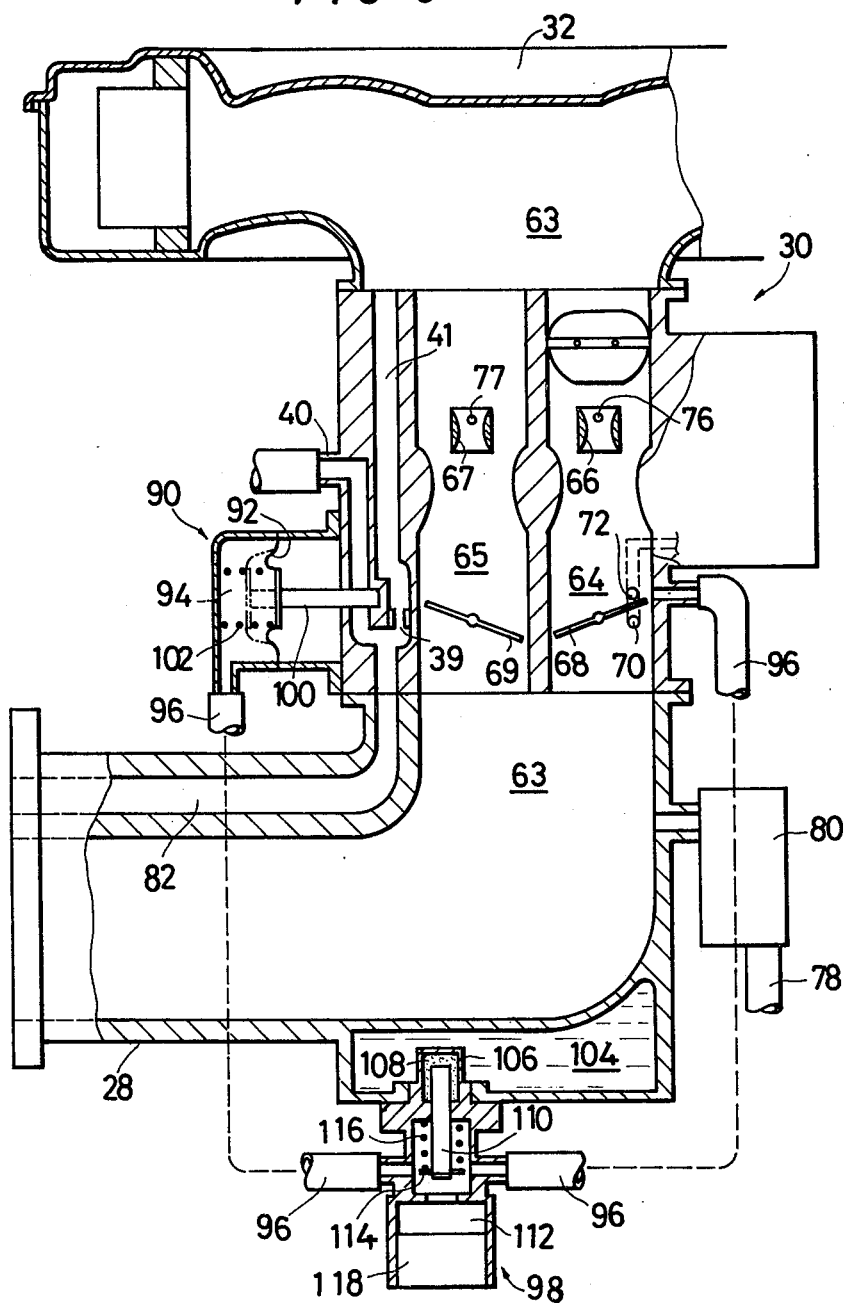
FIG. 8 is a schematic illustration of a third embodiment of the present invention.
Figure 9:
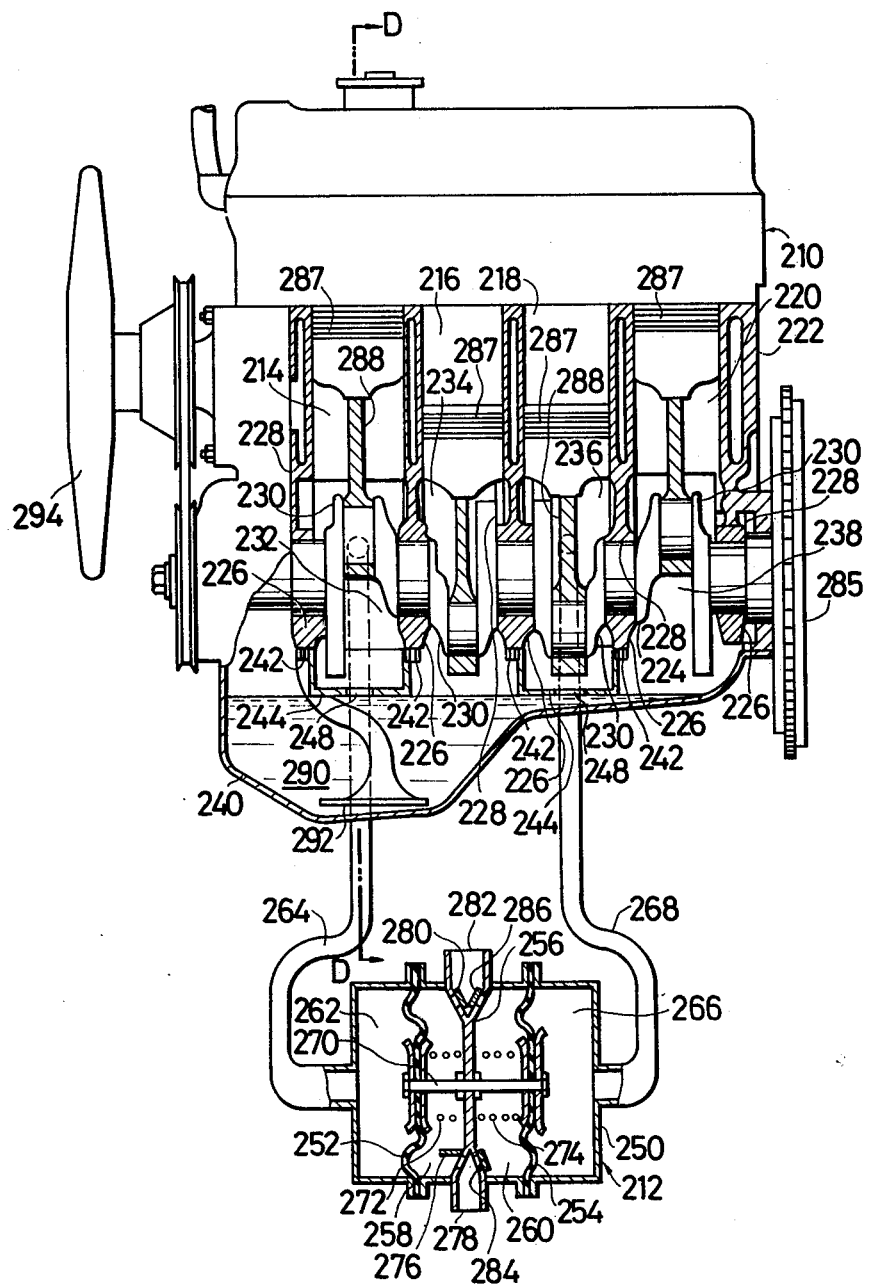
FIG. 9 is a schematic illustration of an air pump used in the third embodiment.
Figure 10:
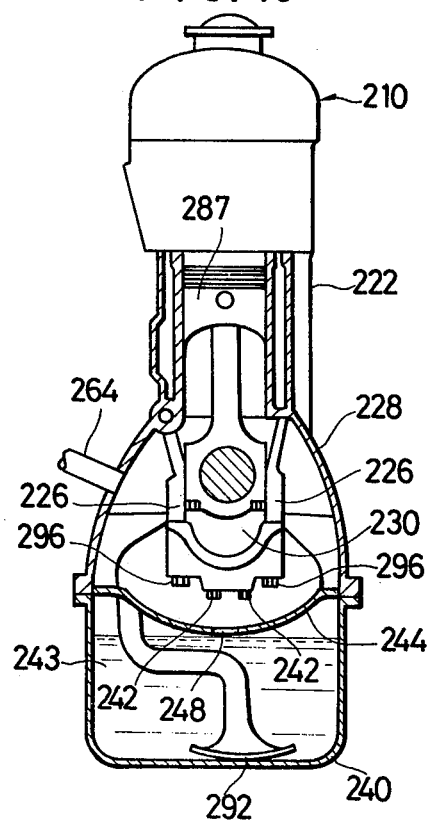
FIG. 10 is a view from line D—D of FIG. 9.
Figure 11:
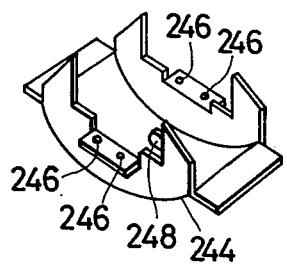
FIG. 11 is a perspective view of a crankcase partition wall.
Figure 12:
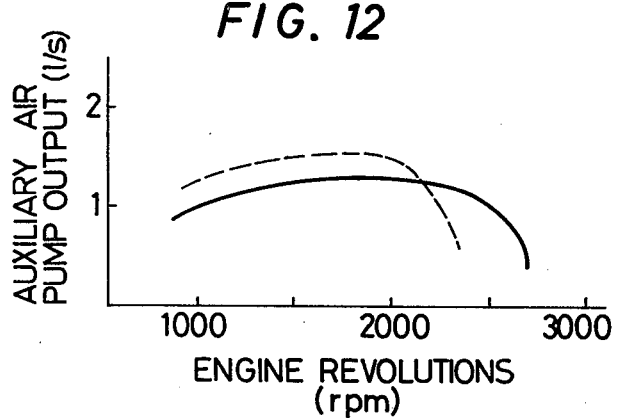
FIG. 12 shows the output characteristics of an air pump.
Figure 13:
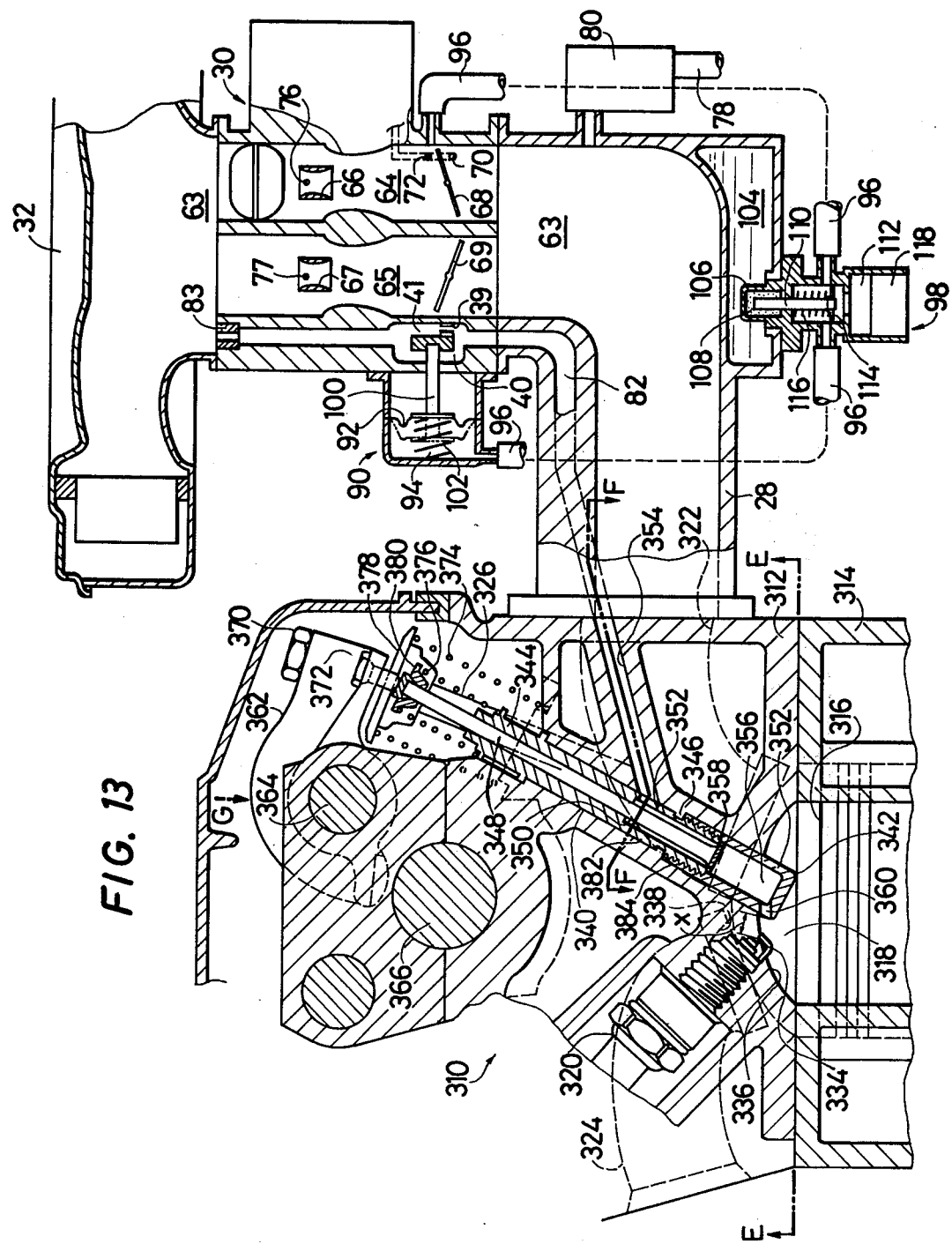
FIG. 13 is a schematic illustration of a fourth embodiment of the present invention.
Figure 14:
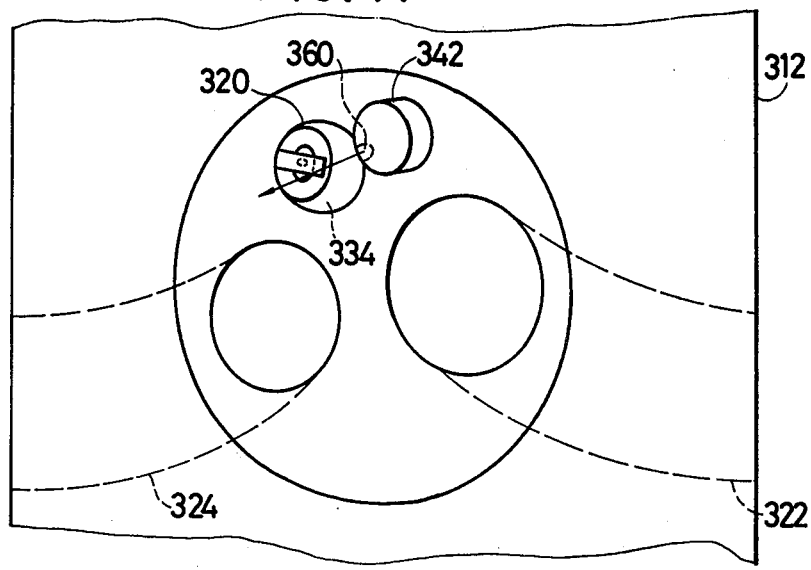
FIG. 14 is a view from line E—E of FIG. 13.
Figure 15:
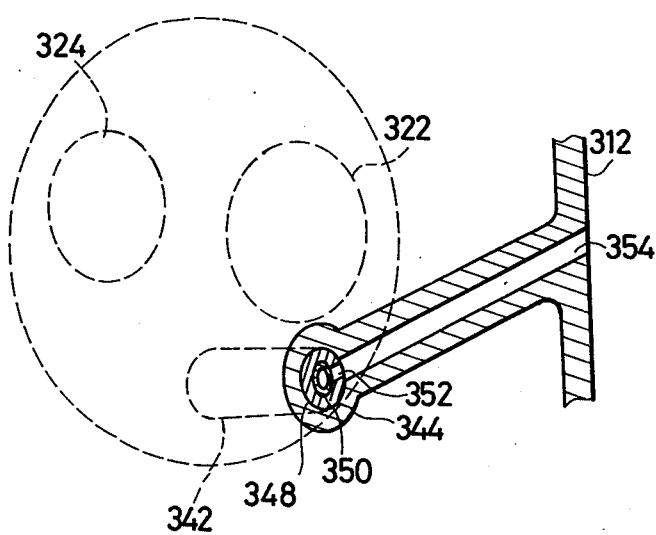
FIG. 15 is a view from line F—F of FIG. 13.
Figure 16:
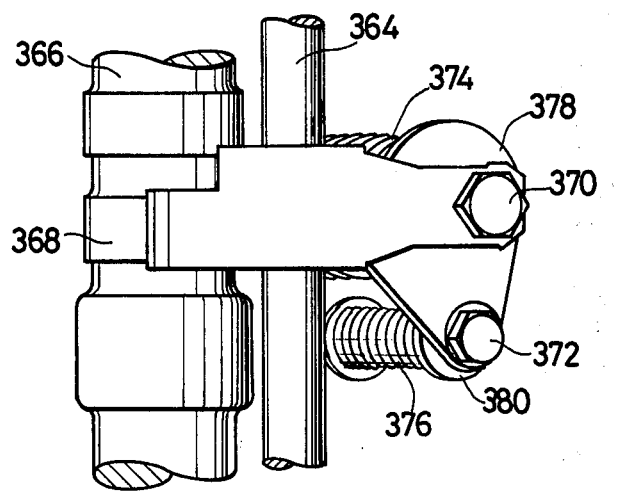
FIG. 16 is a view from line G—G of FIG. 13.

A third embodiment of this invention is shown in FIG. 8, wherein an upstream end of an auxiliary suction passage 40 opens to either an outlet portion of a feed pump for secondary air which is supplied to promote the oxidation of unburned substances in the exhaust system or to a source of recycled exhaust gas (not shown), and a bypass 41 opens into an upstream portion of venturis 66, 67 via a throttle 39. A suitable embodiment of the said pump for secondary air will be described below in reference to FIGS. 9–12.

Reference numberal 210 designates a 4-cycle engine for automobiles and 212 a diaphragm pump for supplying secondary air to the engine exhaust system, not shown in the drawings.

In a lower portion of a cylinder block 222 forming cylinders 214, 216, 218 and 220 a plurality of partitions 228 are disposed substantially parallel to each other to form bearings 226 for crankshaft 224. Between the partitions 228, crank cases 232, 234, 236 and 238 are formed which contain cranks 230 of the crankshaft 224, and the upper portions of crank cases 232, 234, 236 and 238 are communicated with the cylinders 214, 216, 218 and 220, respectively, the lower portions of these crank cases being open to an oil pan 240.

To the lower portions of adjacent partitions 226 holding cylinders 214 and 218 therebetween, partition walls 244 are secured with bolts 242, to separate the crank case 232 communicating with the cylinder 214 and the crank case 236 communicating with the cylinder 218 from the other crank cases and the oil pan 240, respectively.

The walls 244 are provided with holes 246 into which the bolts 242 are fitted, and in the central portions of curved bottom plates of the walls 244, oil-discharging holes 248 are provided.

The diaphragm pump 212 includes two parallel disposed diaphragms 252, 254 within a casing 250. Two pump chambers 258 and 260 are formed between the diaphragms 252, 254 at the sides of a partition plate 256. The pressure chamber 262 defined by the diaphragm 252 is in communication with the crank chamber 232, through a passage 264, while the pressure chamber 266 defined by the diaphragm 254 is in communication with the crank chamber 236, through a passage 268.

A rod 270 slidably passing through the center of the partition plate 256 has both ends connected to the diaphragms 252, 254 at their centers.

The pump chambers 258, 260 accomodate springs 272, 274 for pressing the diaphragms 252, 254, while the pump chamber 258 leads to ambient air through the flap valve 276 and the suction port 278, as well as to an air outlet port 282 through the flap valve 280.

The air outlet port 282 leads to the aforementioned auxiliary suction passage 40 through a conduit, not shown. The pump chamber 260 is in communication with the suction port 278 and the air outlet port 282 through flap valves 284 and 286, respectively. A flywheel 285 is connected to a clutch, not shown, and cylinders 214 to 220 accomodate respective pistons 287 connected to the crank 230 by connecting rods 288. Reference numerals 290, 292, 294 and 296 denote, respectively, lubrication oil, an oil strainer, a cooling fan, and a cap bolt for bearing 226.

As is well known, in 4-stroke engines the crank angles of the pistons in cylinders 214 and 220 are equal, as are those of the pistons in cylinders 216 and 218, leaving therebetween a phase difference of 180°.

If the piston in cylinder 214 is at the bottom of its stroke the air in crank chamber 232 is compressed and forced out through the gap between the partitions 228 and 248, or through the oil drain port.

In spite of this escape the air pressure in the crank chamber is increased so that air is transmitted to the pressure chamber 262 of the diaphragm pump 212 through the air passage 264.

Meanwhile, at the downward stroke of the piston in cylinder 214, the piston in the cylinder 218 is moved up to allow the air in crank chamber 236 to expand. Although a slight amount of air is sucked through the oil drain port 248 and the like from the oil pan 240 or from other crank chambers, the pressure in crank chamber 236 is lowered and transmitted to the pressure chamber 266 through the passage 268.

Consequently, the pressures in crank chambers 232 and 236 are cyclicly changed from high to low during each revolution of the engine, at opposite phases from each other. Thus, the pressures in the chambers 262 and 264 are reversed during each revolution of the engine shaft to thereby actuate the differential pressure pump 212.

The diaphragms 252, 254, and the rod 270 have specific periods of vibration in accordance with the force of the springs 272, 274, and the characteristics of the pump may be changed by altering the force of the springs. Since the period of vibration is normally set for the range of engine speed below a medium speed, the vibration system including the rod 270 and diaphragms cannot follow the frequency of the pressure change in chambers at higher speeds, whereby the pump 212 automatically becomes inactive. The pump as described performs according to the characteristics shown in FIG. 12, wherein the solid curve shows the air-flow characteristics when the force of the springs 272 and 274 are set relatively large, while the broken curve shows the air-flow characteristics with a relatively small spring force.

It will be seen that the speed of the engine at which the air flow rate is drastically decreased, as well as the magnitude of the air flow rate, can be optionally selected by adjusting the force of the springs 272 and 274. The characteristics of the air flow rate at the outlet port 282 are well suited to the flow-rate characteristics of the auxiliary passage 40 shown in FIGS. 1 through 5. The flow rate is also controlled by valve means 90 which are similar to those of the first embodiment. Thus, when there is no air discharge from the outlet port 282 the auxiliary suction passage is completely closed.

Referring now to FIGS. 13 to 16 showing a fourth embodiment of the invention, reference numerals 310, 312, 314, 316, 318, and 320 denote, respectively, the main body of an internal combustion engine, a cylinder head, a cylinder block, a piston, a combustion chamber and an ignition plug, respectively. A main suction or intake port, an exhaust port and a main intake valve are designated by numerals 322, 324 and 326.

The recessed portion of the cylinder head 312 has a hemispherical shape. A spark gap 334 of the spark plug 320 is located at the center of a small recess 338 in the surface 336 of the combustion chamber in the vicinity of an extended plane of the surface. A through bore 340 is formed in the cylinder head adjacent the recess 338, and has an axis inclined at about 60° to the top surface of the piston.

An injection chamber forming member 342 is fitted to the bore 340 from its side facing the combustion chamber, the member being in the shape of a hollow cylinder, while from the other side, a valve guide 344 is fitted. The valve guide 344 has at its periphery a male-threaded portion for engagement with the female-threaded portion on the inner periphery of the injection chamber forming member 342, so that they may be fixed to the cylinder head 312 clamping therebetween a reduced diameter portion 346 of the bore 340.

A circular sectioned auxiliary suction passage 350 is formed between the outer periphery of the auxiliary suction valve 348 and the inner peripheral surface of the valve guide 344, at the side of the later where the threaded portion is formed.

The passage 350 is in communication with another passage 354 formed in the cylinder head 312, through a bore 352 formed in the valve guide 344, and opens into an injection chamber 356 formed in the injection member 342. This opening is adapted to be closed by the engagement of a beveled portion of the auxiliary suction valve 348 with a valve seat 358 formed on the end of the valve guide 344.

The member 342 has an injection bore 360 formed therein to provide a communication between the chamber 356 and the main combustion chamber 318. The bore 360 is located in the vicinity of the spark gap 334 and just below the later, being directed substantially along the spherical wall of the cylinder head.

The main and auxiliary suction valves are both mushroom valves adapted to be driven by a common rocker arm 362 fitted to a rocker shaft 364 and adapted to be rocked upon engagement with a cam 368 formed on a cam shaft 366 which is driven by the engine.

The end of the arm opposite to the cam-engaging portion is forked into two branches each of which have adjusting screws 370, 372. The end of screw 370 is in contact with the upper end of the valve stem of the main suction valve 326, while screw 372 engages the auxiliary suction valve 348.

Numerals 374, 376 denote valve springs, 378, 380 denote springs retainers and 382, 384 designate sealing rings.

According to the above construction, the major part of the air sucked through the air cleaner 32 into the main passage 63 is mixed with fuel at the carburetor 30 to form a mixture of a predetermined ratio. This mixture is sucked into the combustion chamber 318 through the suction port 322. Meanwhile, part of the air is fed to the injection chamber 356 through pipe 82 and the auxiliary suction passages 354, 350, and is then injected into the combustion chamber through the injection port 360.

The amount and magnitude of this injection through the port 360 varies in accordance with the load on the engine, i.e. the opening degree of the throttle valves 68, 69. When the engine is operated at an idling speed or with a small load, the throttle valves are almost closed to provide a large throttling effect to reduce the amount of the mixture through the main suction passage 63, so that a high vacuum is caused in the combustion chamber during the suction stroke of that cylinder. Since the pressure at the upstream side of the venturis 66, 67 is almost atmospheric, the resulting large pressure differential causes a strong injection through the port 360. The consequent vigorous flow of air then passes near the spark gap 334 to effect the scavenging of the air around the gap, and flows down along the spherical surface 336 of the cylinder head, so as to impart a strong swirl and turbulence to the mixture which has been sucked through the main port 322. The swirl and the turbulence are maintained during the compression stroke, to thereby assist the spread of the flame after ignition.

As ignition takes place at the spark gap 334, part of the flame gets into the injection chamber 356. Since the injection chamber is of small volume, a drastic combustion occurs therein so that the resulting flame is forced out through the port 360 by the high pressure created in the injection chamber, into the main combustion chamber 318. This flow of flame is believed to assist the combustion within the main combustion chamber.

For a heavier load operation in which the throttle is more open the throttling effect of valves 68, 69 is not so large, whereby a large amount of fuel mixture flows into the combustion chamber through the main passage 63. Consequently, the amount of injection through chamber 356 is decreased. In this condition, partly because of the high intake efficiency and partly because a large swirl or turbulence is generated as the mixture flows through the suction port 322, in addition to the higher temperature of the inner wall of the combustion chamber, the propagation speed is increased to improve the combustion, without being assisted by the injection of air from the port 360.

In this embodiment, too small a distance x between the spark gap and the injection port would cause the injection chamber forming member 342 to overheat and form a hot spot, which might cause preignition, while too large a distance x would result in a deteriorated scavenging effect, as well as deteriorated combustion due to too late an invasion of the flame into the chamber 356 after ignition.

At the same time, too large a projection of the member 342 into the main combustion chamber would form a hot spot at the projecting end, which might result in preignition and should therefore be avoided. The fuel consumption can be decreased irrespective of whether the port 360 is aimed directly at the spark gap 334 or at a point below it.

The engine of the fourth embodiment may be provided with a throttle valve which is operated through a rod and lever similar to the second embodiment, and may have the upstream end of the auxiliary suction passage suitably opened at the outlet port of the air pump, as is the case of the third embodiment.

Figure 17:
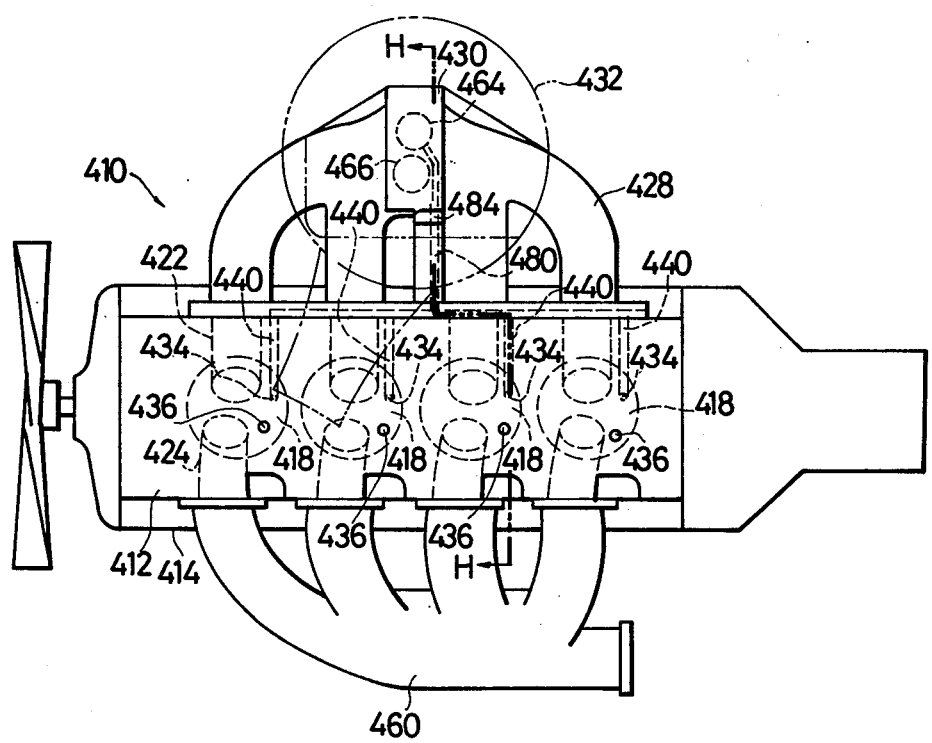
FIG. 17 is a schematic illustration of a fifth embodiment of the present invention.
Figure 18:
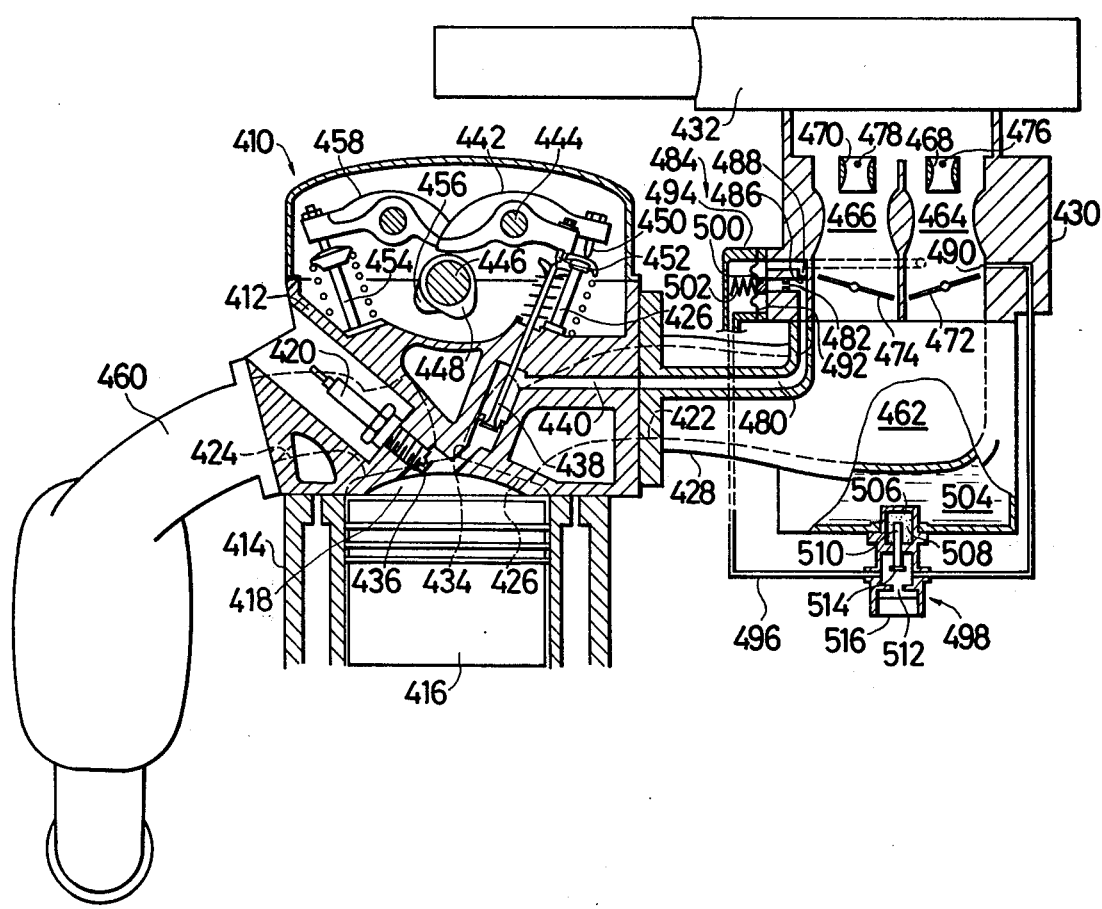
FIG. 18 is a view from line H—H of FIG. 18.

Referring now to the fifth embodiment shown in FIGS. 17 and 18, reference numerals 410, 412, 414, 416, 418, 420, 422, 424, 426, 428, 430 and 432 respectively designate the main body of an engine, a cylinder head, a cylinder block, a piston, a combustion chamber, an ignition plug, a main suction port, an exhaust port, a main suction valve, an intake manifold, a carburetor, and an air cleaner.

An injection port 434 opening into the combustion chamber 418 is formed in the cylinder head 412, and is directed at a point just below the spark gap 436 of the ignition plug 420 at an angle of 30° to 60° to the top surface of the piston. The port 434 is connected to an auxiliary suction passage 440 through an auxiliary suction valve 438.

The main and the auxiliary suction valves 426 and 438 are mushroom type valves adapted to be driven by a common rocker arm 442 fitted to a rocker shaft 444, and adapted to be rocked upon engagement with a cam formed on a cam shaft 446 driven by a crank shaft (not shown) of the engine. The portion of the arm 442 opposite to the end for engagement with the cam 448 is forked into two branches, each of which is provided with an adjusting screw 450 or 452.

The one adjusting screw 450 abuts the upper end of a valve stem of the main suction valve 426, while the other adjusting screw 452 cooperates with the auxiliary suction valve 438. An exhaust valve 454 provided at the exhaust port 424 is adapted to be opened and closed by a cam 456 through a rocker arm 458, to thereby allow the combustion gas to be exhausted into the exhaust manifold 460.

A main suction passage 462 leads from the air cleaner 432 to the suction port 422 via the carburetor 430 and the intake manifold 428. At the portion of the main suction passage corresponding to the carburetor there is provided a primary port 464 and a secondary port 466 for cooperation with respective venturis 468, 470 and throttles 472, 474. In the venturis 468, 470 there are main nozzles 476, 478 adapted to supply fuel during medium or high load operation of the engine.

The auxiliary suction passage 440 is in constant communication with the main suction passage 462 at a point downstream of the venturi 468 but upstream from the throttle valve 472 through an auxiliary suction passage formed in the intake manifold.

The auxiliary suction passage 480 is provided with an orifice 482 for controlling the flow rate therethrough, as well as a control valve means 484 for opening and closing the passage. A by-pass passage 488 directly connects the upstream and downstream sides of the orifice 482, and the control valve means is provided with an orifice 486 for restricting the air flow therethrough. The control valve means 484 has a suction vacuum passage 496, a thermo valve for opening the passage 496 to atmosphere, and a control valve 500. The suction vacuum passage communicates a point 490 just upstream of the closed throttle valve 472 with the vacuum chamber 494 provided with a diaphragm 492. The control valve 500 is connected to the center of the diaphragm 492. A spring 502 biases the control valve 500 to a closed position. The thermo valve 498 is constructed and operates like that of the first embodiment.

In operation, when the engine is hot the rod 510 closes the air bleed passage 512 whereby the vacuum just upstream of the throttle valve 472 is transmitted to the vacuum chamber 494 of the control valve means 484. The degree of opening of the auxiliary suction passage 440 is proportional to the vacuum thus transmitted, so that the gas is jetted through the injection port 434 of the combustion chamber 418.

Meanwhile, the major part of the air sucked from the air cleaner 432 into the main suction passage 462 is mixed at the carburetor 430 with fuel to form a mixture of predetermined ratio, and the mixture is then sucked into the combustion chamber through the suction port 422.

The amount and the magnitude of the jet flow from the injection port 434 depends on the opening degree of the throttle valve 472, i.e. the load on the engine, and on the opening degree of the control valve 500.

During idling or low load operation in which the opening degree of the throttle is small, the large throttling effect reduces the flow rate through the main suction passage 462 and causes a large vacuum in the combustion chamber 418 during the suction stroke. At this time, the fuel mixture is being supplied to the main passage 462 by an idle port (not shown). Since the upstream side of the throttle valve 472 is at nearly atmospheric pressure, the resulting pressure differential causes a strong flow of air into the combustion chamber through the injection port 434, the air reaching the port through the auxiliary passage 440 being restricted by the orifice 486. At the same time, the vacuum chamber 494 is also supplied with atmospheric air through passage 496, whereby the control valve 500 is closed by the spring 502.

Consequently, the mixture within the combustion chamber 418 is swirling and turbulent. At the same time, due to the supply of additional air from the injection port the mixture sucked through the main passage 462 is stratified and diluted in an uneven manner.

The jetted flow of air passes in the vicinity of the spark gap 436 whereby the gases therearound are scavenged to fill the spark gap with new air.

In the medium load operation of the engine the throttling effect of the throttle valve 472 is correspondingly medium, so that the pressure differential between the main and auxiliary passages is small.

However, since the control valve 500 is opened to its maximum opening degree in response to the vacuum just upstream from the throttle valve 472, a relatively large volume of air restricted by the orifices 482 and 486 is supplied and injected to compensate for the reduction in the pressure differential. The mixture supplied through the main passage 462 is supplied partly by the main nozzle 476 and partly by the idle port (not shown). The mixture supplied by main nozzle 476, which is also supplied to auxiliary passage 480, is leaner than the stoichiometric air/fuel ratio.

At the high load operation range of the engine the throttling effect is relatively small so that a large volume of air is sucked by the combustion chamber 418 through the main suction passage 462, so that the vacuum in the combustion chamber becomes relatively small. Accordingly, the jet flow from the auxiliary suction passage is weakened to reduce the swirling and turbulence effects of the injected gas. However, because of an increased suction or intake efficiency and the swirl or turbulency of the mixture as it passes through the suction port 422, as well as an increased temperature of the wall of the combustion chamber, the propagation speed of the flame is sufficiently large, without a strong jet flow through the injection port 434, to cause swirl and turbulence and ensure good combustion.

Although the invention has been described with reference to carburetor-equipped gasoline engines, it is equally applicable to engines having other mixtures forming means, such as a fuel injection system, and the fuel used is not limited to gasoline.

What is claimed is:

1. An internal combustion engine, comprising: a spark plug gap within a combustion chamber; an auxiliary injection port having a directional outlet adjacent the spark plug gap for injecting a charge of a gas such as air, lean fuel mixture, or exhaust gas; a main intake passage for supplying fuel mixture to the combustion chamber via a main intake valve; a throttle valve disposed in the main intake passage for controlling the fuel mixture flow rate; an auxiliary intake passage communicating with the injection port and disposed independently of the main intake passage; a valve disposed within the auxiliary intake passage; and means for controlling said valve in response to the movements of the throttle valve such that said valve is opened to a maximum degree when the throttle valve is opened to an intermediate position, to thereby enhance the swirling effect within the combustion chamber and improve the combustibility of the mixture within the chamber over a wide range of engine running conditions, including idling and light load operation.

2. An internal combustion engine according to claim 1, further comprising a bypass in the auxiliary intake passage for enabling a predetermined amount of flow therethrough when said valve is completely closed.

3. An internal combustion engine according to claim 1, wherein the throttle valve is disposed in the throat of a carburetor for supplying fuel mixture to the combustion chambers of the engine.

4. An internal combustion engine according to claim 1, wherein the upstream end of the auxiliary intake passage opens upstream of a carburetor venturi.

5. An internal combustion engine according to claim 3, wherein the upstream end of the auxiliary intake passage opens between a venturi of said carburetor and said throttle valve.

6. An internal combustion engine according to claim 2, wherein the upstream end of the auxiliary intake passage is coupled to the outlet of an air pump.

7. An internal combustion engine according to claim 2, wherein the upstream end of the bypass opens on the upstream side of a carburetor venturi.

8. An internal combustion engine according to claim 2, wherein the upstream end of the bypass opens between a carburetor venturi and said throttle valve.

9. An internal combustion engine according to claim 2, wherein said valve is controlled in accordance with the magnitude of the negative pressure in the main intake passage at a position upstream of the throttle valve when it is fully closed by a control passage communicating with the main intake passage at said position and included in said valve control means.

10. An internal combustion engine according to claim 2, wherein said valve is mechanically coupled to the throttle valve via a lever and rod linkage.

11. An internal combustion engine as defined in claim 9, wherein said valve control means includes a spring biased diaphragm coupled to said valve and disposed in a negative pressure chamber, said control passage communicates with said negative pressure chamber, and further comprising a thermovalve disposed in said control passage for venting same to atmosphere in response to the engine cooling water temperature.

12. An internal combustion engines as defined in claim 2, wherein said auxiliary injection port outlet is directed at a point just below the spark plug gap and at a glancing angle to the wall of the combustion chamber, to thereby create a swirling and turbulent flow within the combustion chamber.

* * * * *